Patented Nov. 29, 1927.

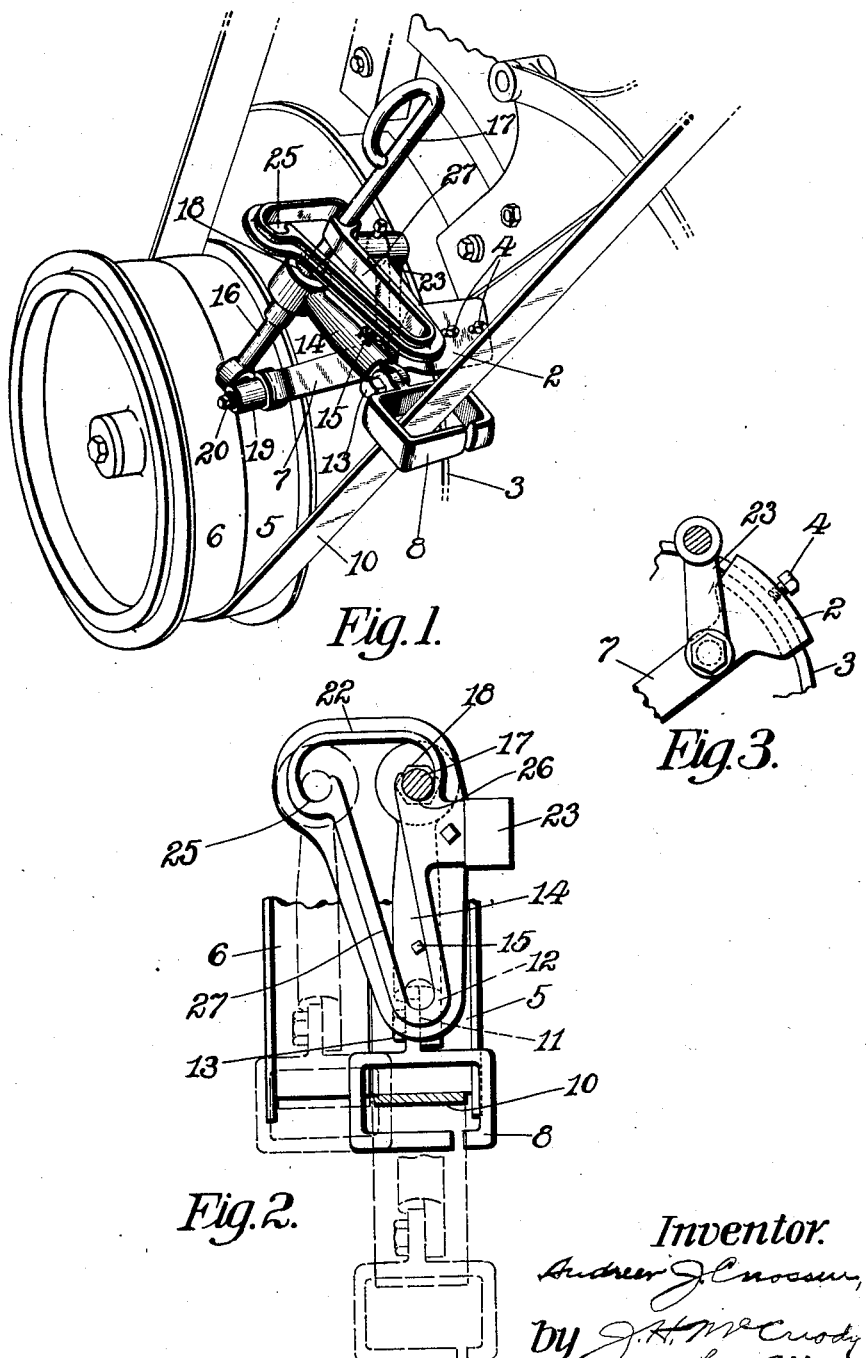

1,651,254

UNITED STATES PATENT OFFICE.

ANDREW J. CNOSSEN, OF NEWBURYPORT, MASSACHUSETTS.

BELT-SHIFTING MECHANISM.

Application filed April 19, 1922. Serial No. 555,618.

This invention relates to devices for shifting a belt from one pulley to another. The invention is especially concerned with the problems that exist in the belt driving of machines having a great deal of inertia, such, for example, as the carding machines used in the textile industry. The cylinders of these machines are very heavy, and consequently when such a machine is first started up, the belt slips for a time until the pulley on which the belt is running has attained considerable speed. In order to reduce this slippage of the belt and make the machine come up to speed more rapidly, it is customary for the machine attendant to press against the flat face of the belt with his hand, as soon as the belt has been shifted, thus tightening or tensioning the belt somewhat and therefore increasing its grip on the pulley. This practice obviously is dangerous, and it is highly objectionable both to the employers and also to insurance companies.

It is the chief object of the present invention to devise a mechanism with which this belt tensioning operation can be performed without danger to the machine attendant. It is also an object of the invention to devise a mechanism which will operate automatically, both to shift the belt and also to apply tension thereto, as just described. The invention is furher directed to the provision of a device of this character which can be manufactured economically, will be reliable in operation, and will be convenient to use.

The nature of the invention will be readily understood from the following description and the novel features will be particularly pointed out in the appended claims.

Referring now to the drawings,

Figure 1 is a perspective view of a mechanism constructed in accordance with the present invention, and showing the same applied to a carding machine;

Fig. 2 is a plan view, partly in cross section, of certain of the parts shown in Fig. 1;

Fig. 3 is a side view of a portion of the bracket that supports the other parts of the mechanism.

The mechanism shown includes a bracket 2 comprising a head having a notch or slot therein to receive the flange 3 which projects at the end of a carding machine adjacent to the driving pulley. Set screws 4—4 secure the bracket on the flange. The fast and loose pulleys are shown at 5 and 6, respectively, and the bracket 2 includes a shank 7 that projects toward the fast pulley 5. The belt shipper fork is shown at 8 and preferably is of the closed type so that it embraces the belt 10. An ear 11 projects from one side of this fork and is adjustably secured by means of a bolt 13 to a similar ear 12 having a shank projecting therefrom into an arm 14 where it is secured by a set screw 15. This arm is mounted rigidly on a lever comprising a lower part 16 and an upper part or handle 17. The handle is threaded into the part 16 and a nut 18, screwed down tightly on the shank of the arm 14, holds this part securely against a shoulder on the member 16. This operating lever is mounted to swing in two planes at right angles to each other, the lower end of the lever being pivoted on a stud that projects radially from a collar 19, which is itself mounted to rotate on a stud 20 secured fast in the lower end of the part 7.

A bracket 22 is secured in a stationary position by means of an arm 23 which is bolted to the main support 2, and this bracket is provided with two notches 25 and 26 designed to hold the lever 17 in either of its operative positions; that is, in such positions that the fork 8 will hold the belt on either the fast or loose pulley. Between the notches 25 and 26 is an inclined slot 27, as clearly shown in the drawings.

So long as the machine is at rest, the belt 10 is on the loose pulley 6, and the lever 17 is resting in the notch 25 of the bracket 22, as indicated by dotted lines in Fig. 2. When it is desired to start the machine into operation, it is simply necessary to lift the lever 17 out of the notch 25 and allow it to drop into the slot 27. The parts that pivot about the stud 20 are all relatively heavy, and consequently the weight of the lever 17, and the parts movable therewith, cause it to slide down the inclined left-hand wall, Fig. 2, of the slot 27. This slot is directed toward the right, as clearly shown in Fig. 2, so that this movement automatically results in shifting the belt onto the fast pulley 5. At the same time, the weight of the parts connected with the shipper fork 8 presses this fork against the flat face of the belt 10 and thus exerts a tensioning or tightening action on the belt which increases its grip on the fast pulley 5 in exactly the same way that this result is produced by the hand of the workman. After the machine has come up to speed, it is simply necessary to lift the lever 17 out of the bottom of the slot 27 and place it in the notch 26, where it will be held with the belt on the fast pulley. When it is desired to stop the machine, the lever 17 is lifted out of the notch 26 and placed in the notch 25, this movement being transmitted directly to the shipper fork 8 and resulting in the transfer of the belt to the loose pulley 6.

It will now be appreciated that this invention provides a very simple form of belt shipper which acts automatically under the influence of gravity to shift the belt from the loose to the fast pulley and, simultaneously, to tension the belt and thereby increase its grip on the fast pulley. The construction is so simple that it can be manufactured very economically and it is not liable to get out of order. It is especially valuable in avoiding the necessity of the workman touching the belt with the consequent danger of having his hand or clothing caught in it.

Another important practical advantage of this mechanism is that it does not require the presence of the attendant at any given machine, for any substantial length of time, in starting it into operation. The attendant simply goes from one machine to another, lifting each lever 17 out of the notch 25 and dropping it into the slot 27. The shifting of the belt takes place automatically and the machines comes up to speed. The workman then makes the round of the machines again, lifting each lever 17 into its running position in the notch 26. A substantial saving in time therefore is effected in getting the machines in a card room into production after each shut down.

While I have herein shown and described the best embodiment of the invention of which I am at present aware, it will be appreciated that this embodiment may be modified in many particulars without departing from the spirit or scope of this invention. It will also be understood that while I have shown an embodiment of the invention designed especially for use on carding machines, and while it is particularly valuable on such machines, nevertheless its use is not limited to this type of machine.

Having thus described my invention, what I desire to claim as new is:

1. A belt shipper of the character described, comprising, in combination, a shipper fork, means operative to utilize gravity to move said fork to shift the belt, and simultaneously to tension said belt.

2. A belt shipper of the character described, comprising, in combination, a shipper fork, and means for utilizing gravity to operate said fork to cause it to shift the belt and to bear against the flat face of the belt to tighten it.

3. A belt shipper of the character described, comprising, in combination, a shipper fork, a weighted part connected therewith, means for guiding said part to cause its movement under the influence of gravity to shift said belt and simultaneously to press said fork against the flat face of the belt to tension the belt.

4. A belt shipper of the character described, comprising, in combination, a shipper fork, a part connected therewith, means supporting said part for pivotal movement to shift the fork from one of its operative positions to another, means for holding said part in either of said positions, and a device for guiding said part to cause its movement under the influence of gravity to effect said shifting operation.

5. A belt shipper of the character described, comprising, in combination, a shipper fork, a weighted lever connected with said fork, means supporting said lever for movement in planes at right angles to each other, a bracket having notches therein to support said lever in either of its operative positions, and an inclined slot in said bracket between said notches.

6. A belt shipper of the character described, comprising, in combination, a shipper fork, a weighted lever rigidly connected with said fork, a main support, a double pivotal connection between the support and lever enabling the lever to move about two intersecting axes at right angles to each other, the weight of the lever and the parts connected therewith being so disposed that the lever tends to swing about one of said axes by gravity, a stationary bracket having notches therein to support said lever in either of its operative positions, and an inclined slot in said bracket located between said notches whereby when said lever is placed in the upper part of said slot it will slide down the slot under the influence of gravity and the inclination of said slot will cause it to shift the belt.

7. Mechanism of the character described, comprising in combination a belt, a loose pulley, a fast pulley, a shipper fork, means for retaining the fork in alinement with the loose pulley, and means operable automatically upon the release of said fork from said retaining means to cause said fork to shift the belt and simultaneously to apply tension thereto.

8. Mechanism of the class described, including a shipper fork and a guide adapted to cause said fork, under the influence of gravity, to ship a belt and to apply tension thereto simultaneously.

9. In mechanism of the class described, a belt, a loose pulley and a fast pulley, means operative automatically for shifting said belt from the loose to the fast pulley and for simultaneously applying tension to the belt, and means whereby said tension may be released without transferring the belt from the fast to the loose pulley.

10. A belt shipper of the character described, comprising, in combination, a shipper fork, and a single mechanism operable automatically to move said fork to shift the belt and simultaneously to cause said fork to tension the belt.

11. A belt shipper of the character described, comprising, in combination, a shipper fork, and means operable automatically to move said fork transversely of the length of the belt to shift the belt and simultaneously to press said fork against one flat face only of the belt to tension the belt.

ANDREW J. CNOSSEN.